Nov. 17, 1936.    J. M. THOMAS    2,061,094
OIL FIELD TANK EQUIPMENT
Filed Aug. 30, 1932    2 Sheets-Sheet 1
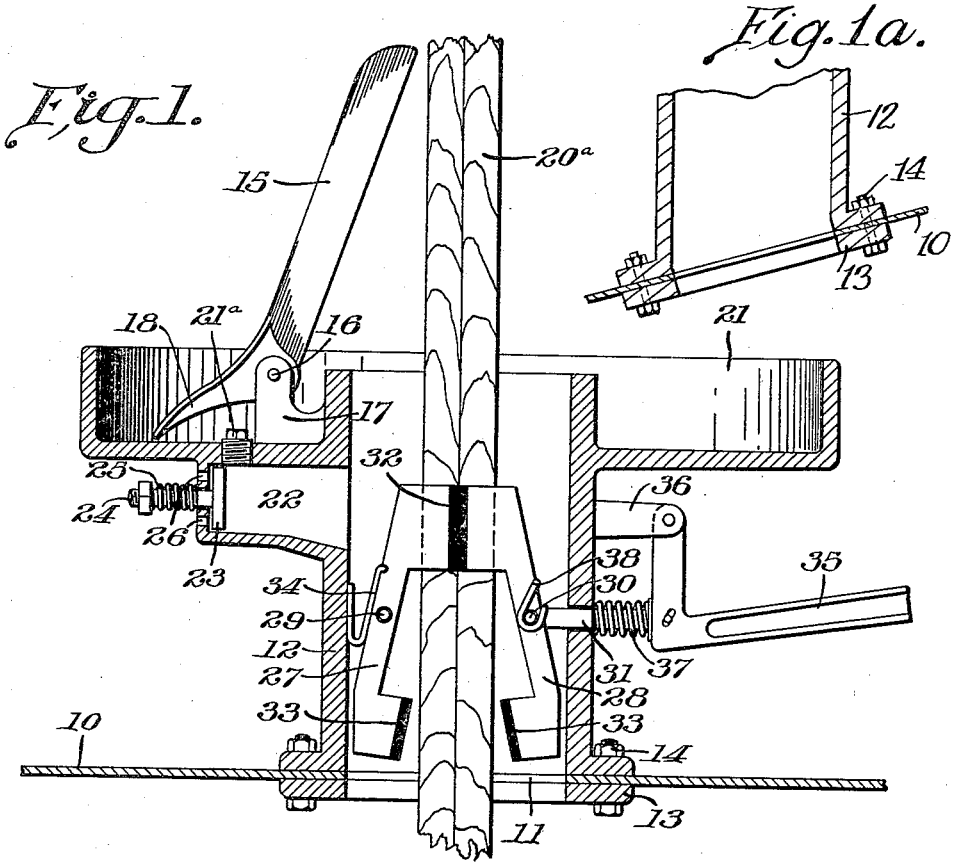

Nov. 17, 1936.   J. M. THOMAS   2,061,094
OIL FIELD TANK EQUIPMENT
Filed Aug. 30, 1932   2 Sheets—Sheet 2
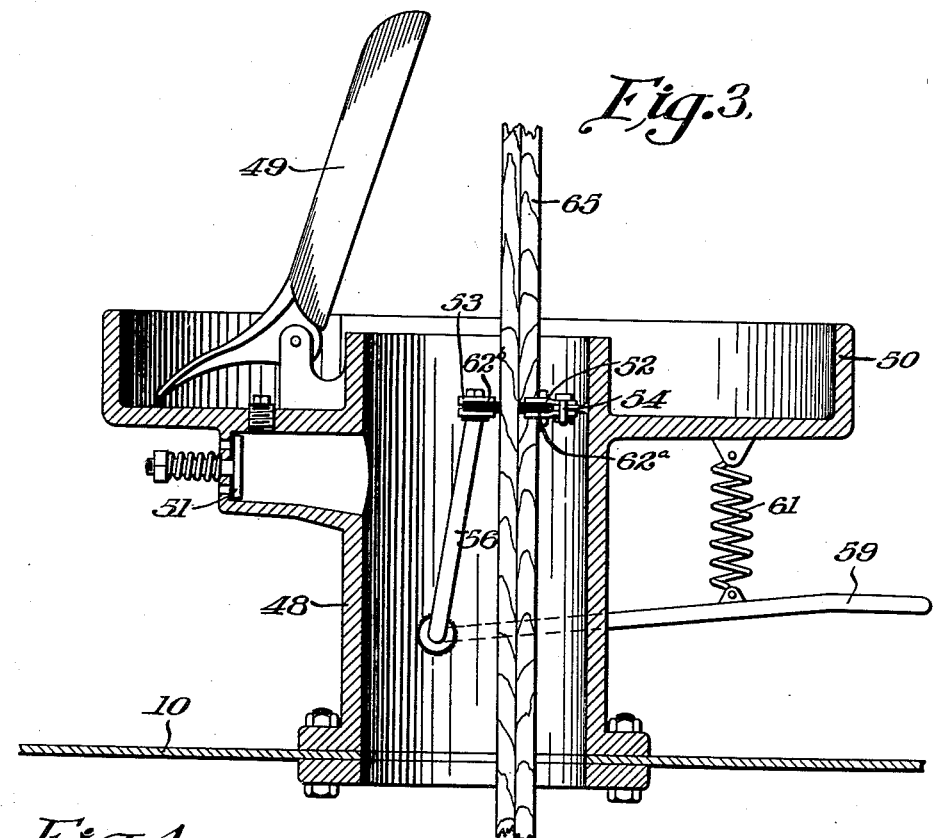
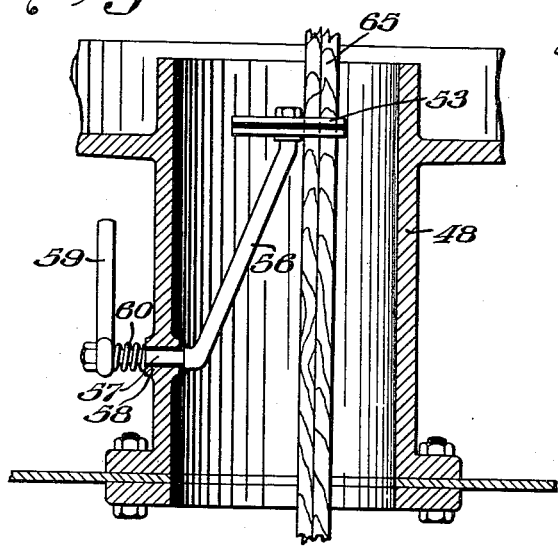
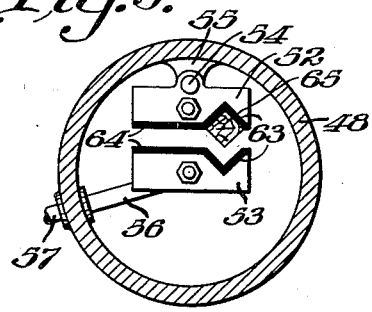
JAMES M. THOMAS
INVENTOR
BY R. J. Dearborn
HIS ATTORNEY Patented Nov. 17, 1936

2,061,094

UNITED STATES PATENT OFFICE 2,061,094

OIL FIELD TANK EQUIPMENT

James M. Thomas, Lefors, Tex., assignor to The Texas Company, New York, N. Y., a corporation of Delaware Application August 30, 1932, Serial No. 630,998

4 Claims. (Cl. 15—210)

My invention relates to equipment for tanks used for storing liquids such as oil, and more particularly to improvements in the thief or gauge hatches used when sampling or gauging the liquid contained in the tank.

Oil field tanks are usually provided with at least one opening, sometimes called a thief or gauge hatch, in the top or roof portion, this opening being normally closed by a suitable cover. Samples of the oil may be taken out through this opening and it is also customary to measure the quantity of oil in the tank through the use of a gauge pole or gauge line either of which may be inserted and lowered into the tank through this opening. It frequently happens that when the gauge pole or gauge line is withdrawn, oil will drip therefrom onto the top of the tank and unless this oil is carefully wiped up the appearance of the tank will suffer and the fire hazard will also be appreciably increased. Furthermore, it sometimes happens that small quantities of oil will blow out of the hatch due to the turbulence in the oil when a well is flowing into the tank and this oil will settle on the tank and so mar its appearance, or, if rags or waste are used to wipe up this oil, the rags may inadvertently be left on or near the tank and will increase the danger of fire.

It is the object of my invention to provide a device for stripping the oil from the gauge pole or gauge line and returning this oil to the tank after the measurement has been taken, and also to provide additional means for catching and returning to the tank any oil which would ordinarily collect on the tank near the hatch. Thus the appearance of the tank will be improved and the danger of fire resulting from oil or oily rags left on the tank will be lessened.

In carrying out my invention I have provided a hatch including a member which surrounds the thief or gauge hole and which houses a stripping device for removing oil from the gauge pole or gauge line, and which further serves as a support for a pan for collecting and returning spilled oil to the tank. A vacuum relief valve is also embodied in the housing member to allow air to enter the tank to prevent the formation of a vacuum therein when oil is being withdrawn from the tank.

For a better understanding of my invention reference may be had to the accompanying drawings, in which Fig. 1 is a sectional elevation of an embodiment of my invention; Fig. 1a is a sectional elevation of a portion of the device as applied to a tank having a sloping roof; Fig. 2 is a plan view of the device as shown in Fig. 1 with parts of the pan broken away; Fig. 3 is a sectional elevation of a modification; Fig. 4 is a sectional elevation looking from the left in Fig. 3 while Fig. 5 is a view looking downwardly through the housing of Fig. 3.

Referring to Figs. 1 and 2 of the drawing, I have shown a device embodying one form of my invention attached to the roof of a tank 10 having a thief hole or opening 11. A housing member 12 which may be formed of a short length of tubing and shown in this embodiment as rectangular in section is securely attached to the tank 10 by any suitable means such as a clamping ring 13 and bolts 14, the opening through the member 12 being in alignment with the thief hole 11 in the tank. A hinged cover 15 is mounted at the upper end of the housing 12 by means of a pin or bolt 16 passing through an ear 17 which is formed integral with or attached to the housing. The cover 15 is normally held in its closed position by gravity but may be raised to the position shown in Fig. 1 by pressing downwardly upon an extension 18 formed with the cover. The cover 15 is rectangular in shape and slightly larger than the top of the housing 12 so that it will overlap the upper edge of the housing when in the closed position.

The under side of the edge or periphery of the cover 15 is concave downwardly, and the concave portion is adapted to rest upon the upper edge of the housing 12. It will thus be seen that assuming the cover 15 to be in its closed position, if oil contained in the tank 10 should be blown out of the housing 12, as might happen, for instance, when the tank 10 is being filled directly from a pumping well, the oil will lift the cover 15 slightly and will be turned or directed downwardly due to the shape of the concave portion of the cover. In order to catch this oil which will drip from the edge of the cover 15 and also to provide a support on which a measuring pole such as the pole 20a or sampling instruments may be rested, I have provided a pan member 21 which may be formed integral with or attached to the upper portion of the housing 12. Any oil which may drip from the cover 15 or from the measuring or sampling instruments will be collected in the pan 21 and may flow back into the tank through a small opening normally closed by a suitable plug 21a. While the housing 12 has been shown as extending vertically from a horizontal roof 10, my invention is equally applicable to tanks having sloping roofs. As shown in Fig. 1a the lower end of the housing 12 may be formed at an angle corresponding to the angle of slope of the roof so that when installed the housing will project vertically from the roof. The pan 21 is especially advantageous in the case of a sloping roof since it affords a horizontal support for the instruments.

In order to prevent the forming of a vacuum within the tank 10 when oil is drawn therefrom, I have provided a vacuum relief valve mounted in a chamber 22 formed in one side of the housing 12. This valve comprises a valve head 23 and a stem 24, the stem being slidably mounted in the wall of the housing. A compression spring 25 encircles the stem 24 and serves to bias the valve toward its closed position. Air inlet ports 26 are formed in the wall of the chamber 22 and are normally closed by the valve 23. Should, however, a vacuum form within the tank 10 the valve 23 will be drawn inwardly and air will pass to the inside of the tank through the ports 26.

In order to clean or strip oil from a gauge line or from a gauge pole such as the pole 20a after a measurement of the contents of the tank has been made, I have provided a pair of cleaning brackets 27 and 28, the bracket 27 being pivoted at a point near its center to the housing 12 by means of a pin 29, and the bracket 28 being pivoted by means of a pin 30 to one end of a short rod or shaft 31, the purpose of which will be explained hereinafter. To the ends of the brackets 27 and 28 are secured pairs of rubber wiping members 32 and 33, the rubbers 32 being affixed to the upper ends while the rubbers 33 are affixed to the lower ends of the brackets. The upper end of each bracket 27 and 28 is V-shaped so that when the upper ends of both brackets are together, as shown in Figs. 1 and 2, the rubber wiping members 32 will snugly surround the square gauge pole 20a. On the other hand, the lower ends of the brackets 27 and 28 are straight across so that if the lower ends of the brackets are together, a gauge line, usually in the form of a flat tape, pulled between the rubbers 33, 33 would be wiped or stripped clean of adhering oil.

A spring 34 is mounted between the back side of the upper end of the bracket 27 and the housing 12, this spring serving to bias the upper end of the bracket toward the right, as shown in Fig. 1. The shaft 31 is slidably mounted in the side of the housing 12 and at its outer end is attached by means of a pin and slot connection to an L-shaped lever 35 which is pivotally mounted on an extension 36 secured to the housing 12. A compression spring 37 encircles the shaft 31 between the housing and the lever 35 and serves to normally bias the entire bracket 28 toward the right, that is, with the back of the bracket against the inner side of the housing 12. A spring 38 is mounted between the bracket 28 and the shaft 31 and serves to bias the upper end of the bracket 28 toward the left, as shown in Fig. 1.

With the brackets in open position, that is, with the bracket 28 drawn to the right by means of the spring 37, a sampling device or a measuring device such as the pole 20a or a gauge line may be inserted downwardly into the tank 10 through the housing 12 and a measure or sample of the oil may be taken in the usual manner. After the measurement has been taken and it is desired to clean the pole, the lever 35 is pressed downwardly thus compressing the spring 37 and forcing the bracket 28 to the left. The spring 38 will cause the upper end of the bracket 28 to engage the pole 20a and the wiping members 32 at the upper ends of both brackets will strip the adhering oil from the pole as the pole is pulled upwardly. If a gauge line is being used instead of the pole 20a the lever 35 is depressed to a greater extent than in the case where a pole is being used and the entire bracket 28 will be moved toward the left, while the bracket 27 will move slightly counter-clockwise about its pivot 29. The rubber wiping members 33, 33 at the lower ends of the brackets 27 and 28 will thus be brought together and when the gauge line is pulled upwardly the members 33, 33 will strip and clean the oil therefrom. When substantially all of the gauge line has been pulled upwardly between the wiping members 33, 33, pressure on the lever 35 may be released and the plumb bob which is usually attached to the lower end of the gauge line may then be pulled upwardly between brackets 27 and 28 and out of the hatch.

In Figs. 3, 4 and 5 I have illustrated a modified form of my invention. In this form the housing 48 which is secured to the top of the tank 10 is cylindrical in shape and likewise the cover 49 is circular so as to fit the upper end of the housing. In this embodiment the construction and use of the cover 49, the collecting pan 50 and the vacuum relief valve 51 are the same as that of the corresponding parts in the form illustrated in Figs. 1 and 2. However, the wiping or cleaning apparatus has been simplified and comprises a pair of brackets 52 and 53, the first of which is pivotally secured to the inner side of the housing 48 by means of a bolt 54 and a projecting lug 55 while the bracket 53 is pivotally attached to the upper end of a bent rod 56.

The rod 56 has a horizontal portion 57 which passes through a suitable bearing 58 formed in one side of the housing 48, and to the outer end of the horizontal portion 57 is secured a lever 59. Between the lever 59 and the bearing 58 a small compression spring 60 is provided in order to hold the rod 56 tightly against the inner side of the bearing so as to prevent loss of liquid or vapor through the bearing. A spring 61 is attached to the lever 59 and to the underside of the collecting pan 50 and normally pulls the lever 59 upwardly, thus holding the rod 56 in a position to the left of that shown in Fig. 3, i. e., with the bracket 53 retracted against the left hand inner side of the housing 48. The brackets 52 and 53 serve respectively to hold pieces of rubber or felt 62a and 62b which form wiping members corresponding in purpose to the members 32 and 33 of Fig. 1. The brackets 52 and 53 and the wiping members 62a and 62b are provided at one end with V-shaped portions 63 and at the other end with straight edged portions 64.

In using this form of my invention, if it is desired to clean a gauge pole 65, the pole is placed in the position shown resting within the V-shaped portion 63 of the wiping member 62a and the lever 59 is then depressed, moving the rod 56 and the bracket 53 into position with the V-shaped portion of the wiping member 62b against the other half of the pole 65. The pole may then be pulled upwardly and the wiping members 62a and 62b will strip from the pole any oil tending to adhere thereto.

If a gauge line is being used instead of the pole 65, the operation will be the same except that the line will be placed between and pulled upwardly through or between the straight portions 64 of the wiping members 62a and 62b.

If it is desired to take a sample from the tank, the bracket 53 and wiping member 62b will be allowed to remain in their open position and the sampling instrument may then be lowered and raised through the housing 48 between the brackets 52 and 53.

Obviously many modifications and variations of the invention, as hereinbefore set forth, may be made without departing from the spirit and scope thereof, and therefore only such limitations should be imposed as are indicated in the appended claims.

I claim:

1. A thief hatch for a liquid holding tank, said tank being provided with an opening in its roof through which sampling and measuring instruments may be inserted into and removed from said tank, comprising a vertical housing surrounding said opening, a wiping member pivotally mounted in said housing, a shaft movably mounted in said housing, a second wiping member pivotally mounted on one end of said shaft and disposed opposite said first mentioned wiping member, and a lever for engaging the other end of said shaft to force said second wiping member toward said first wiping member so that said members will engage a measuring device and strip from said device liquid adhering thereto.

2. In apparatus for cleaning a tank gauging device, a housing, a bracket pivotally mounted at its center in said housing and disposed in a substantially vertical position, a shaft slidably mounted in said housing, a second bracket pivotally mounted at its center on one end of said shaft and disposed opposite and substantially parallel to said first mentioned bracket, a wiping member secured to each end of each of said brackets, resilient means for biasing the upper ends of said brackets toward each other, a spring for biasing said shaft and said second bracket away from said first bracket, and a lever pivotally mounted on said housing and engaging said shaft to force said second bracket toward said first bracket against the compression of said spring whereupon said gauging device will be engaged by the wiping members on either the upper or lower ends of said brackets so that liquid adhering to said gauging device will be stripped therefrom as said device is pulled through said housing.

3. In apparatus for cleaning a tank gauging device adapted to be inserted in a tank through an opening therein, a tubular housing secured to said tank in alignment with said opening, a pair of wiping members mounted within said housing, said wiping members being provided with oppositely disposed notched portions, one of said wiping members being secured to said housing, a rockable arm pivoted at one end in said housing and connected at its other end to the other of said wiping members, resilient means for biasing said arm away from said first mentioned wiping member, and means for rocking said arm toward said first mentioned wiping member so that the notched portions of said members will be brought into wiping engagement with a gauging device which may be pulled through said members.

4. In apparatus for cleaning a tank gauging device, a housing, a wiping member pivotally mounted at its center in said housing and disposed in a substantially vertical position, a shaft slidably mounted in said housing, a second wiping member pivotally mounted at its center on one end of said shaft and disposed opposite and substantially parallel to said first mentioned wiping member, the upper ends of said wiping members being provided with V-shaped portions while the lower ends of the wiping members are provided with straight-faced portions, and a lever pivotally mounted on said housing and engaging said shaft to force said second wiping member toward said first member, whereupon said gauging device if square in cross section will be engaged by the V-shaped portions of said wiping members while if said gauging device is in the form of a line, it will be engaged by the straight-faced portions of said wiping members so that liquid adhering to said gauging device will be stripped therefrom as said device is pulled through said housing.

JAMES M. THOMAS.